(12) United States Patent
Li

(10) Patent No.: US 12,279,721 B1
(45) Date of Patent: Apr. 22, 2025

(54) LEAK-PROOF TRAY FOR FROZEN FOOD

(71) Applicant: Guojian Li, Guangdong (CN)

(72) Inventor: Guojian Li, Guangdong (CN)

( * ) Notice: Subject to any disclaimer, the term of this patent is extended or adjusted under 35 U.S.C. 154(b) by 0 days.

(21) Appl. No.: 18/792,872

(22) Filed: Aug. 2, 2024

(51) Int. Cl.
| | |
|---|---|
| *B65D 85/78* | (2006.01) |
| *A23G 9/26* | (2006.01) |
| *A23G 9/50* | (2006.01) |
| *A47J 43/00* | (2006.01) |
| *A47J 47/14* | (2006.01) |

(52) U.S. Cl.
CPC .............. *A47J 47/14* (2013.01); *A23G 9/503* (2013.01); *A23G 9/506* (2013.01); *B65D 85/78* (2013.01)

(58) Field of Classification Search
CPC .......... A23G 9/50; A23G 9/503; A23G 9/506; A47J 47/14; B65D 85/78; A47G 19/30
USPC ........ 206/562; 426/132, 134, 115, 139, 565, 426/421, 91
See application file for complete search history.

(56) References Cited

U.S. PATENT DOCUMENTS

| | | | | |
|---|---|---|---|---|
| 2,321,519 A | * | 6/1943 | Rubinoff ................ | A23G 9/503 229/932 |
| 2,632,708 A | * | 3/1953 | Sueskind ............... | A23G 9/503 426/134 |
| 2,803,550 A | * | 8/1957 | Ackalusky .............. | A23G 9/26 D1/102 |
| 2,948,452 A | * | 8/1960 | Grogan .................. | B65D 85/78 229/932 |
| 3,088,643 A | * | 5/1963 | Dunn ..................... | B65D 85/78 426/134 |
| 4,574,987 A | * | 3/1986 | Halligan ................. | A23G 9/44 383/110 |
| 5,224,646 A | * | 7/1993 | Biancosino ............ | A23G 9/288 229/932 |
| 5,515,998 A | * | 5/1996 | Wang .................. | A47G 19/2266 220/574 |
| 5,531,347 A | * | 7/1996 | Goulding ............... | B65D 47/40 215/310 |
| 6,032,825 A | * | 3/2000 | Guthrie ............. | B65D 43/0208 220/780 |
| 6,182,854 B1 | * | 2/2001 | Jimenez .................. | A23G 9/44 426/115 |
| 6,202,970 B1 | * | 3/2001 | Dunbar .................... | A23G 3/34 248/94 |
| D540,006 S | * | 4/2007 | Green ........................ | D1/105 |
| 8,747,928 B2 | * | 6/2014 | Price ..................... | A23G 9/503 426/106 |
| 9,033,180 B1 | * | 5/2015 | Falke .................... | B65D 23/06 220/571.1 |

(Continued)

*Primary Examiner* — Gideon R Weinerth

(57) ABSTRACT

A leak-proof tray for frozen food includes a first tray main body and a second tray main body. The first tray main body includes a first sleeving opening, and the first sleeving opening is configured for receiving an ice-cream cone. The second tray main body is connected to the first tray main body. The second tray main body is provided with a second sleeving opening. The second sleeving opening is configured for receiving an ice lolly stick. When a user consumes the ice-cream cone, the cone can be inserted into the first sleeving opening, so that the first tray main body can accommodate the melted liquid of the ice-cream cone. When the user consumes an ice lolly, the second tray main body can be fitted onto the first sleeving opening of the first tray main body, and the ice lolly stick can be inserted into the second sleeving opening.

19 Claims, 6 Drawing Sheets

(56) References Cited

U.S. PATENT DOCUMENTS

| | | | |
|---|---|---|---|
| 10,011,407 B2* | 7/2018 | Buck | B65D 21/0224 |
| 10,638,888 B1* | 5/2020 | Barnes | A47J 47/16 |
| 2001/0017299 A1* | 8/2001 | Schmarr | A23G 9/503 |
| | | | 220/571 |
| 2002/0029697 A1* | 3/2002 | Oshio | A23G 9/506 |
| | | | 99/426 |
| 2006/0185990 A1* | 8/2006 | Rybar | B65D 81/3211 |
| | | | 206/219 |
| 2007/0054019 A1* | 3/2007 | Sotile | B65D 85/78 |
| | | | 426/420 |
| 2007/0114235 A1* | 5/2007 | Neasham | A23G 9/503 |
| | | | 220/574 |
| 2007/0148296 A1* | 6/2007 | Price | A23G 9/506 |
| | | | 426/420 |
| 2009/0101663 A1* | 4/2009 | Pratt | B65D 85/78 |
| | | | 220/742 |
| 2011/0223292 A1* | 9/2011 | Kushner | A23G 9/503 |
| | | | 220/571 |
| 2012/0058218 A1* | 3/2012 | Blondeau | A23G 9/503 |
| | | | 426/135 |
| 2012/0205382 A1* | 8/2012 | Price | B65D 85/78 |
| | | | 220/574 |
| 2015/0052082 A1* | 2/2015 | Pordy | B65D 85/78 |
| | | | 220/592.2 |
| 2018/0007931 A1* | 1/2018 | Rosenberg | A23G 9/503 |
| 2020/0060307 A1* | 2/2020 | Chessum | A23G 9/503 |
| 2021/0345640 A1* | 11/2021 | Macdonald | A23G 9/503 |
| 2024/0228157 A1* | 7/2024 | Grabowski | A47G 19/02 |
| 2024/0341324 A1* | 10/2024 | Leary | B65D 81/3813 |

* cited by examiner

LEAK-PROOF TRAY FOR FROZEN FOOD

TECHNICAL FIELD

The present disclosure relates to the field of articles for daily use, particularly to a leak-proof tray for frozen food.

BACKGROUND ART

In the hot summer, ice lollies, ice-cream cones and other frozen food are indispensable to quench thirst. When people consume ice lollies, ice-cream cones and other foods, they often encounter the situation that the ice lollies and the ice-cream on the ice-cream cones melts into liquid. The melted liquid flows down along a support stick or an outer wall of the cone and flows onto the hands or body of the consumer, causing inconvenience. In addition, if the ice lolly is not properly stored and the whole ice lolly is almost melted, it is possible that the whole ice lolly falls off the support stick. Since the supporting force of the ice lolly body is not enough, the frozen food that the user is looking forward to tasting may be ruined, and the clothes and the ground may also be stained, causing great trouble to the user. Therefore, there is an urgent need to provide a leak-proof tray for frozen food on the market to prevent the melted liquid from flowing along the support stick or the outer wall of the cone onto the hands or body of the consumer, thereby improving the user experience.

SUMMARY

In order to overcome the shortcomings of the prior art, a leak-proof tray for frozen food is disclosed, including a first tray main body and a second tray main body.

The first tray main body includes a first sleeving opening, and the first sleeving opening is configured for receiving an ice-cream cone. A first accommodating groove is defined in the first tray main body, and the first sleeving opening is defined in a bottom wall of the first accommodating groove.

The second tray main body is connected to the first tray main body. The second tray main body is equipped with a second top wall and a second side wall. The second top wall is provided with a second sleeving opening, and the second sleeving opening is configured for receiving an ice lolly stick.

The second tray main body is detachably inserted into the first sleeving opening, and the second tray main body covers the first sleeving opening.

As an improvement of the present disclosure, the first tray main body is equipped with a first inner surface and a first outer surface. The first inner surface is recessed to form the first accommodating groove. The first tray main body is equipped with a first mounting part, and the first mounting part is provided with a first mounting side wall. The first mounting side wall is positioned below the first sleeving opening. The second tray main body is detachably connected to the first mounting side wall. The second top wall covers the first sleeving opening, and the second side wall covers the first mounting side wall.

As an improvement of the present disclosure, the second top wall is connected to the second side wall, and a first mounting groove is surrounded and formed by the first mounting side wall. A groove opening is defined in the first outer surface, and the first sleeving opening is defined in the first inner surface. The first mounting groove is positioned below the first sleeving opening. One side of the first mounting groove is in communication with the first sleeving opening, and an opposite side of the first mounting groove is in communication with the groove opening. The second top wall is detachably inserted into the first sleeving opening through the groove opening, and the second side wall is detachably inserted into the first mounting groove through the groove opening, so that an outer side surface of the second side wall is pressed against an inner side surface of the first mounting side wall.

As an improvement of the present disclosure, the second tray main body is also provided with a stop part. The second top wall is connected to one side of the second side wall, and the stop part is connected to an opposite side of the second side wall.

As an improvement of the present disclosure, an outer diameter of the stop part is greater than an outer diameter of the second side wall, and the stop part stops at a bottom surface of the first mounting side wall.

As an improvement of the present disclosure, the second tray main body is also provided with a raised lifting portion. The lifting portion extends from the stop part.

As an improvement of the present disclosure, the leak-proof tray for frozen food further includes a flexible member, and the second tray main body is connected to the first tray main body through the flexible member.

As an improvement of the present disclosure, the leak-proof tray for frozen food further includes a flexible member, and the second tray main body is connected to the first tray main body through the flexible member. One end of the flexible member is connected to the first mounting part, and an opposite end of the flexible member is connected to the stop part.

As an improvement of the present disclosure, the first tray main body is a first silicone tray main body or a first rubber tray main body, the second tray main body is a second silicone tray main body or a second rubber tray main body, and the flexible member is a silicone or rubber flexible member.

As an improvement of the present disclosure, the leak-proof tray for frozen food further includes an elastic wall. The elastic wall is connected to the second tray main body, and the elastic wall is movable to cover the second sleeving opening. The elastic wall is integrally formed with the second tray main body.

As an improvement of the present disclosure, the elastic wall is equipped with a first upper side wall, a first lower side wall, a first left side wall, and a first right side wall. The first lower side wall is connected to the second tray main body. The first lower side wall, the first left side wall, and the first right side wall are movable to detach from the second tray main body.

As an improvement of the present disclosure, a cross-section of the first mounting side wall and a cross-section of the second side wall are both in a truncated cone shape. The inner side surface of the first mounting side wall is an inclined surface, and the outer side surface of the second side wall is an inclined surface. An inner diameter of the first mounting side wall gradually decreases from the bottom surface of the first mounting side wall to a top surface of the first mounting side wall, and an outer diameter of the second side wall gradually decreases from a top surface of the second side wall to a bottom surface of the second side wall.

As an improvement of the present disclosure, a length of the second sleeving opening is less than a length of the first sleeving opening, and a width of the second sleeving opening is less than a width of the first sleeving opening.

As an improvement of the present disclosure, a second accommodating groove is defined in the second tray main body, and the second sleeving opening is defined in a bottom wall of the second accommodating groove.

As an improvement of the present disclosure, the first mounting part is also provided with a stop protrusion, and the second side wall is equipped with a lower concave surface. When the second tray main body is detachably connected to the first mounting side wall, the stop protrusion covers the lower concave surface.

As an improvement of the present disclosure, a length range of the first sleeving opening is 20 mm-50 mm, a width range of the first sleeving opening is 20 mm-50 mm, a length range of the second sleeving opening is 5 mm-25 mm, and a width range of the second sleeving opening is 1 mm-10 mm.

As an improvement of the present disclosure, a depth range of the first accommodating groove is 5 mm-30 mm, and a depth range of the second accommodating groove is 5 mm-30 mm. A depth range of the first sleeving opening is 2 mm-30 mm, and a depth range of the second sleeving opening is 1 mm-30 mm.

As an improvement of the present disclosure, a length range of the flexible member is 5 mm-50 mm, and a width range of the flexible member is 3 mm-30 mm.

As an improvement of the present disclosure, the first tray main body, the second tray main body, and the flexible member are integrally formed.

As an improvement of the present disclosure, the second sleeving opening of the second tray main body is elongated, and the length of the second sleeving opening is at least three times the width of the second sleeving opening.

As an improvement of the present disclosure, a length range of the first accommodating groove is 40 mm-130 mm, and a width range of the first accommodating groove is 40 mm-130 mm. A length range of the second accommodating groove is 20 mm-50 mm, and a width range of the second accommodating groove is 20 mm-50 mm.

As an improvement of the present disclosure, a top edge of the first tray main body is provided with a plurality of concave notches, and the first inner surface is also provided with a plurality of rib positions protruding toward the first accommodating groove. The first outer surface is also provided with a plurality of groove positions recessed toward the first accommodating groove. The groove positions are aligned with the rib positions.

The beneficial effects of the present disclosure are as follows. The leak-proof tray for frozen food is disclosed, including the first tray main body and the second tray main body. The first tray main body includes the first sleeving opening, and the first sleeving opening is configured for receiving the ice-cream cone. The first accommodating groove is defined in the first tray main body, and the first sleeving opening is defined in the bottom wall of the first accommodating groove. The second tray main body is connected to the first tray main body. The second tray main body is equipped with the second top wall and the second side wall. The second top wall is provided with the second sleeving opening, and the second sleeving opening is configured for receiving the ice lolly stick. The second tray main body is detachably inserted into the first sleeving opening, and the second tray main body covers the first sleeving opening. Therefore, when a user consumes the ice-cream cone, the cone can be inserted into the first sleeving opening, so that the first tray main body can accommodate the melted liquid of the ice-cream cone, preventing the melted liquid of the ice-cream cone from flowing onto the hands and body of the consumer or the ground. Moreover, when the user consumes an ice lolly, the ice lolly stick can be inserted into the second sleeving opening, so that the second tray main body can accommodate the melted liquid of the ice lolly, preventing the melted liquid of the ice lolly from flowing onto the hands and body of the consumer or the ground.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
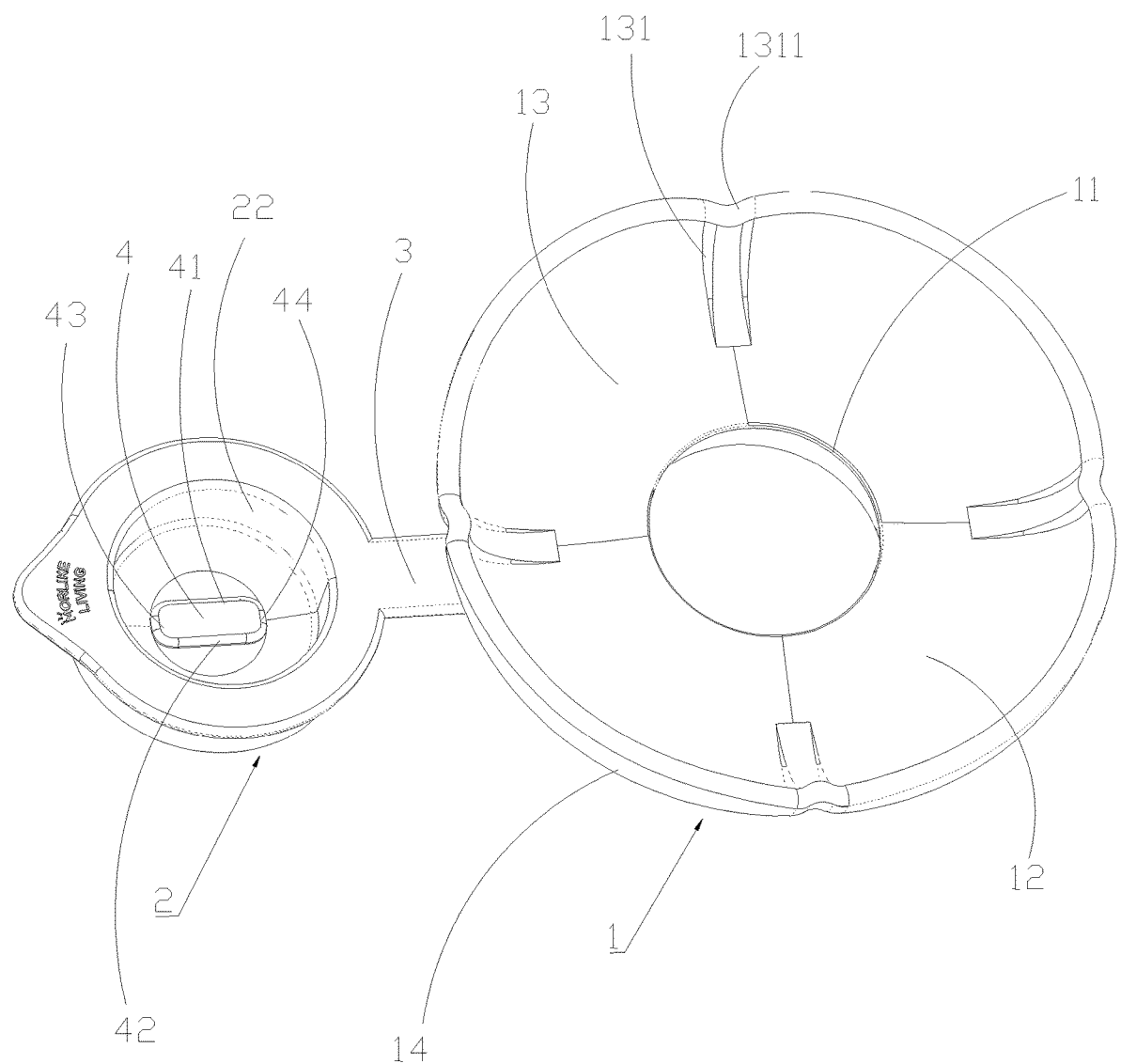
FIG. 1 is a schematic diagram of an overall structure of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
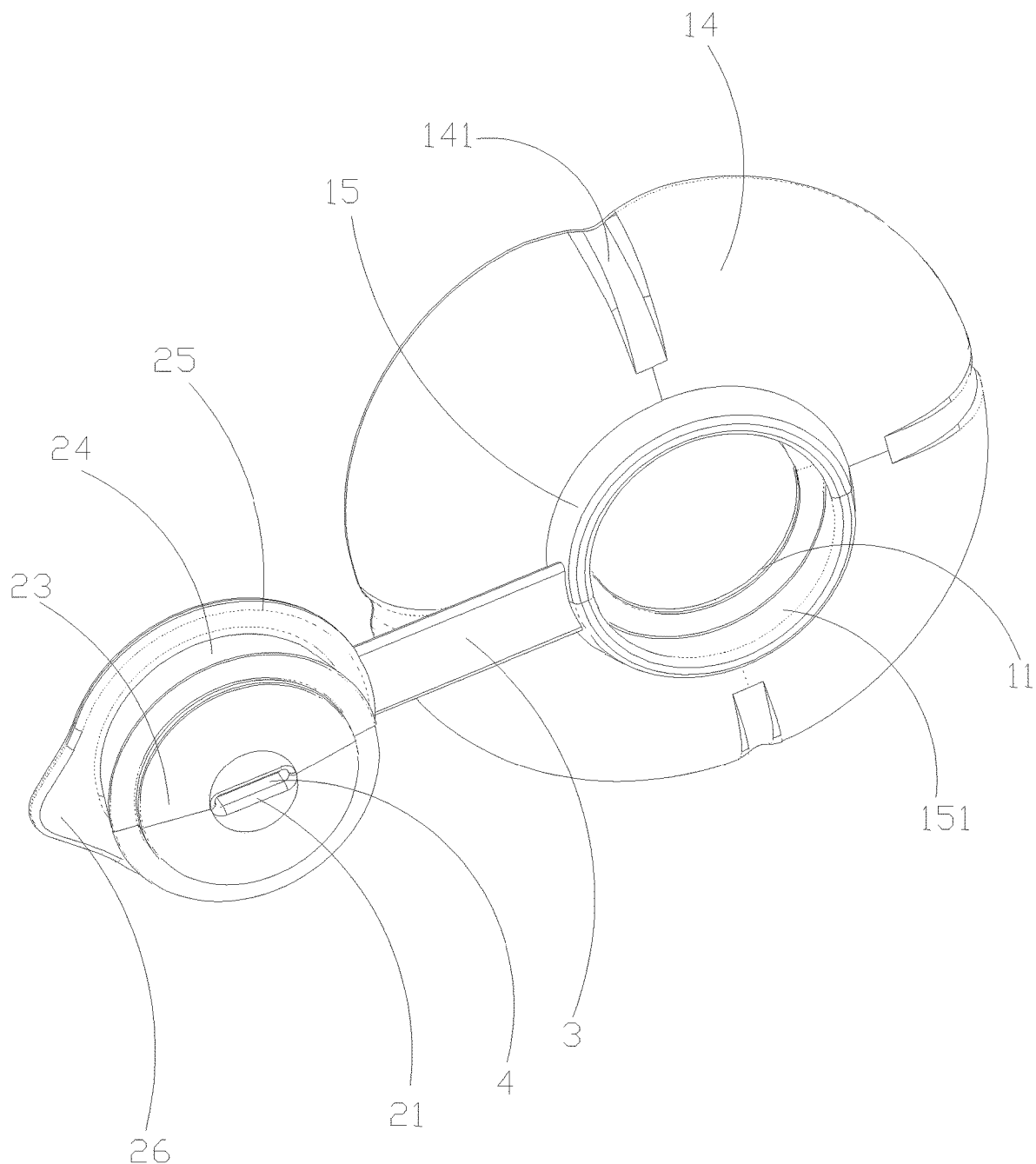
FIG. 2 is another schematic diagram of an overall structure of the present disclosure.
Figure 3:
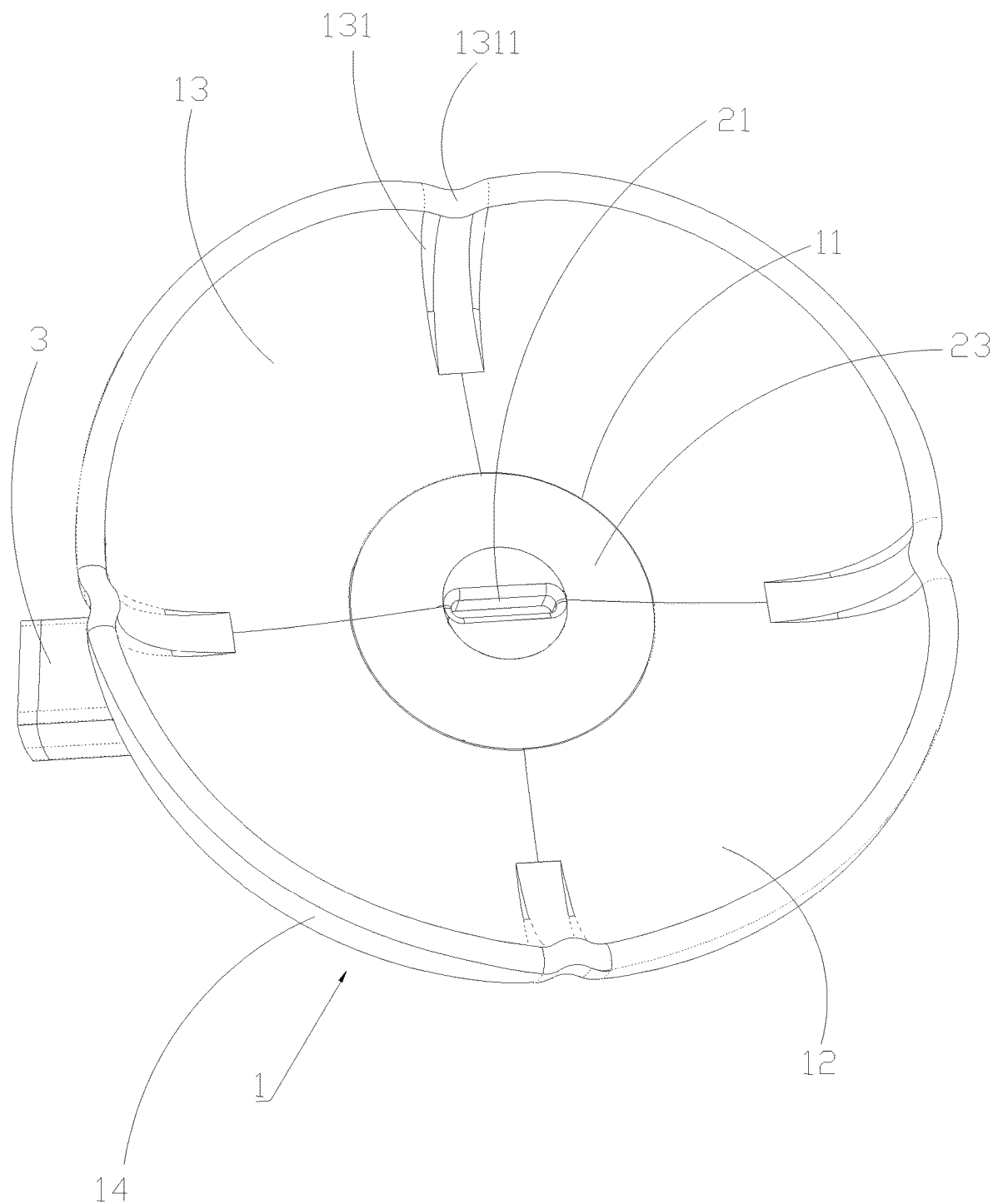
FIG. 3 is a schematic diagram of an overall structure when a second tray main body is inserted into a first mounting side wall and a first sleeving opening.
Figure 4:
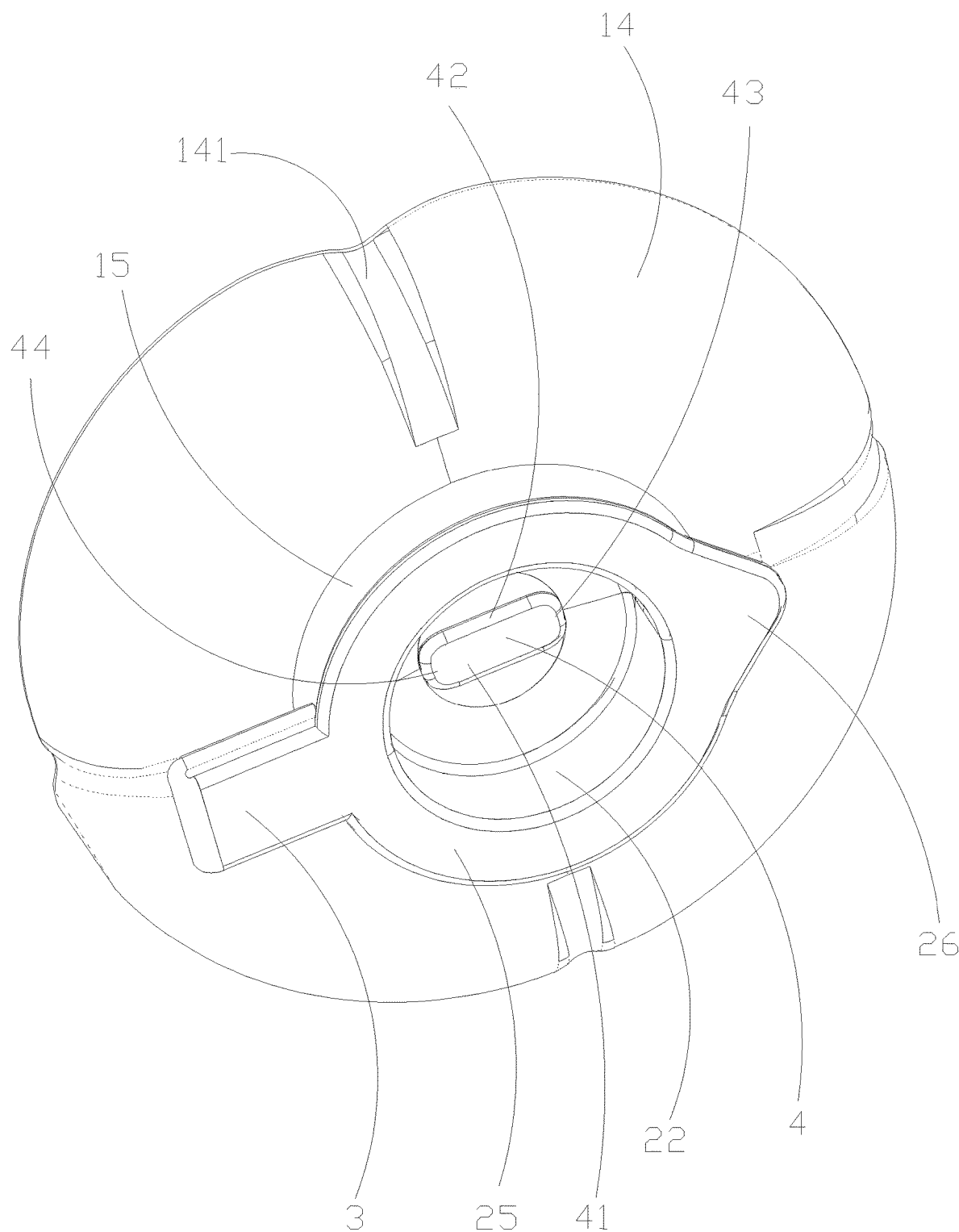
FIG. 4 is another schematic diagram of an overall structure when a second tray main body is inserted into a first mounting side wall and a first sleeving opening.
Figure 5:
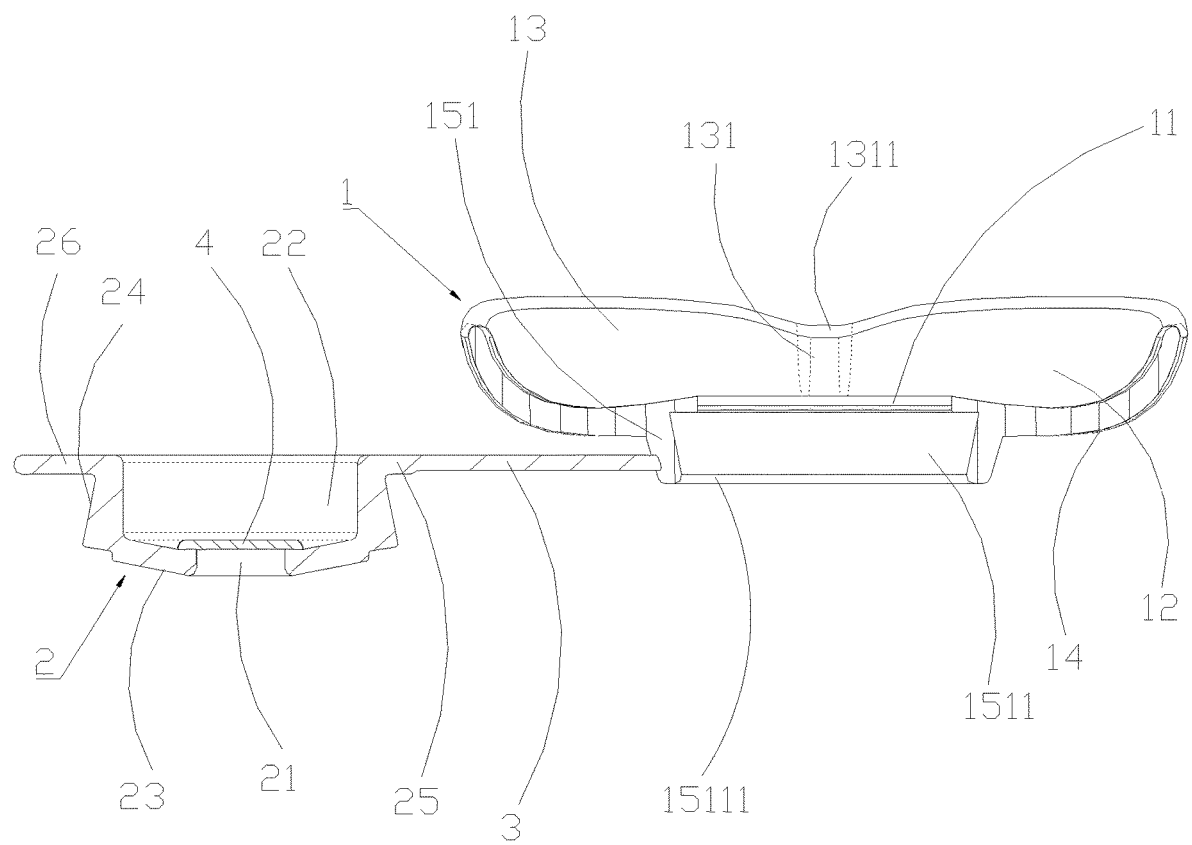
FIG. 5 is a sectional view cut along a first tray main body and a second tray main body.
Figure 6:
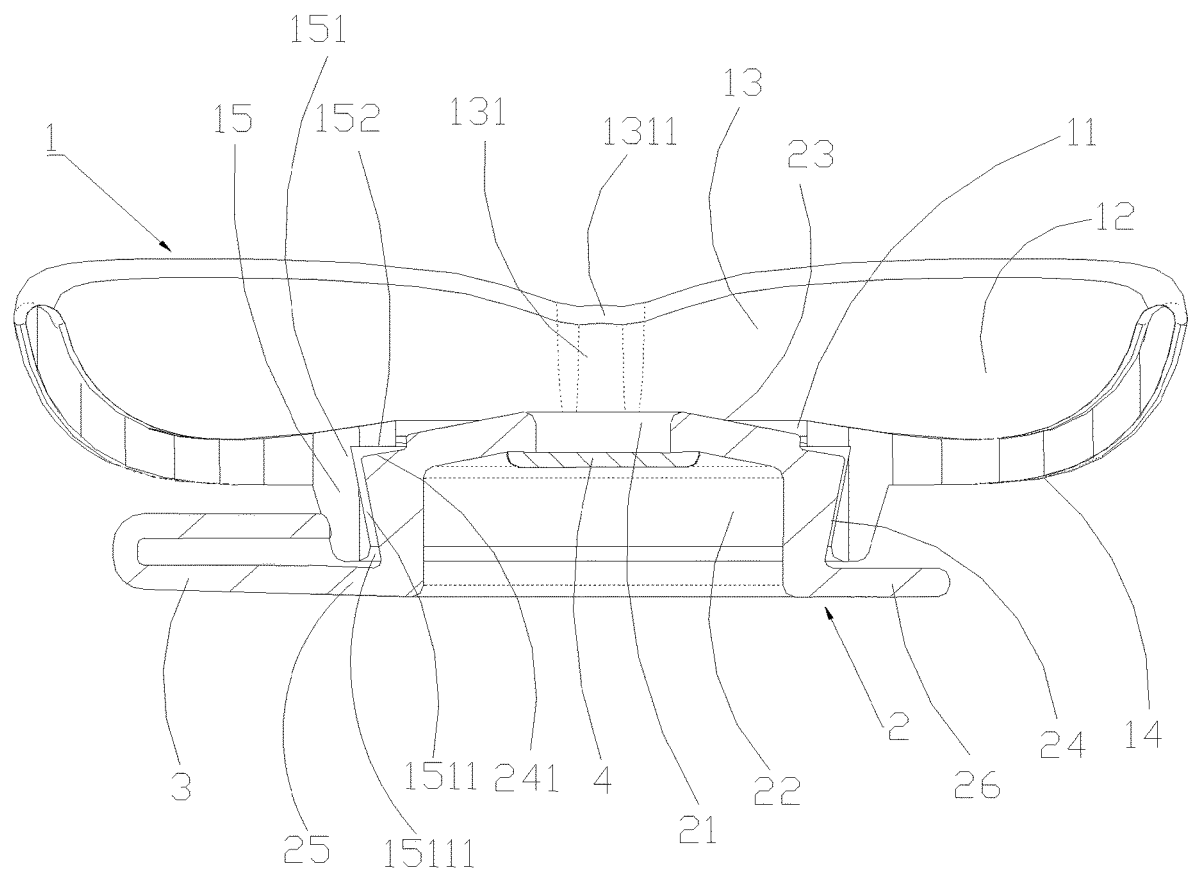
FIG. 6 is a sectional view cut along a first tray main body and a second tray main body when the second tray main body is inserted into a first mounting side wall and a first sleeving opening.

Referring to FIGS. 1-6, a leak-proof tray for frozen food includes a first tray main body 1 and a second tray main body 2.

The first tray main body 1 includes a first sleeving opening 11, and the first sleeving opening 11 is configured for receiving an ice-cream cone. A first accommodating groove 12 is defined in the first tray main body 1, and the first sleeving opening 11 is defined in a bottom wall of the first accommodating groove 12.

The second tray main body 2 is connected to the first tray main body 1. The second tray main body 2 is equipped with a second top wall 23 and a second side wall 24. The second top wall 23 is provided with a second sleeving opening 21, and the second sleeving opening 21 is configured for receiving an ice lolly stick.

The second tray main body 2 is detachably inserted into the first sleeving opening 11, and the second tray main body 2 covers the first sleeving opening 11.

Through the above structure, the leak-proof tray for frozen food includes the first tray main body 1 and the second tray main body 2. The first tray main body 1 includes the first sleeving opening 11, and the first sleeving opening 11 is configured for receiving the ice-cream cone. The first accommodating groove 12 is defined in the first tray main body 1, and the first sleeving opening 11 is defined in the bottom wall of the first accommodating groove 12. The second tray main body 2 is connected to the first tray main body 1. The second tray main body 2 is equipped with the second top wall 23 and the second side wall 24. The second top wall 23 is provided with the second sleeving opening 21, and the second sleeving opening 21 is configured for receiving the ice lolly stick. The second tray main body 2 is detachably inserted into the first sleeving opening 11, and the second tray main body 2 covers the first sleeving opening 11. Therefore, when a user consumes the ice-cream cone, the cone can be inserted into the first sleeving opening 11, so that the first tray main body 1 can accommodate the melted liquid of the ice-cream cone, preventing the melted liquid of the ice-cream cone from flowing onto the hands and body of the consumer or the ground. Moreover, when the user consumes an ice lolly, the ice lolly stick can be inserted into the second sleeving opening 21, so that the second tray main body can accommodate the melted liquid of the ice lolly, preventing the melted liquid of the ice lolly from flowing onto the hands and body of the consumer or the ground.

In this embodiment, the first tray main body 1 is equipped with a first inner surface 13 and a first outer surface 14. The first inner surface 13 is recessed to form the first accommodating groove 12. The first tray main body is equipped with a first mounting part 15, and the first mounting part 15 is provided with a first mounting side wall 151. The first mounting side wall 151 is positioned below the first sleeving opening. The second tray main body 2 is detachably connected to the first mounting side wall 151. The second top wall covers the first sleeving opening, and the second side wall covers the first mounting side wall. A second accommodating groove 22 is defined in the second tray main body 2, and the second sleeving opening 21 is defined in a bottom wall of the second accommodating groove 22. Through the above structure, when the user consumes the ice-cream cone, the cone can be inserted into the first sleeving opening 11, so that the first accommodating groove 12 of the first tray main body 1 can accommodate the melted liquid of the ice-cream cone, preventing the melted liquid of the ice-cream cone from flowing onto the hands and body of the consumer or the ground. Moreover, when the user consumes the ice lolly, the ice lolly stick can be inserted into the second sleeving opening 21, so that the second accommodating groove 22 of the second tray main body 2 can accommodate the melted liquid of the ice lolly, preventing the melted liquid of the ice lolly from flowing onto the hands and body of the consumer or the ground. The first mounting part 15 extends from the first inner surface 13 or the first outer surface 14 of the first tray main body.

In this embodiment, the second top wall 23 is connected to the second side wall 24, and a first mounting groove 1511 is surrounded and formed by the first mounting side wall. A groove opening 15111 is defined in the first outer surface, and the first sleeving opening is defined in the first inner surface. The first mounting groove is positioned below the first sleeving opening. One side of the first mounting groove is in communication with the first sleeving opening, and an opposite side of the first mounting groove is in communication with the groove opening. The second top wall 23 is detachably inserted into the first sleeving opening 11 through the groove opening, and the second side wall 24 is detachably inserted into the first mounting groove through the groove opening, so that an outer side surface of the second side wall is pressed against an inner side surface of the first mounting side wall. The second tray main body 2 is also provided with a stop part 25. The second top wall 23 is connected to one side of the second side wall 24, and the stop part 25 is connected to an opposite side of the second side wall 24. Specifically, an outer diameter of the stop part 25 is greater than an outer diameter of the second side wall 24, and the stop part 25 stops at a bottom surface of the first mounting side wall 151. Furthermore, the second tray main body 2 is also provided with a raised lifting portion 26. The lifting portion 26 extends from the stop part 25. Furthermore, the first mounting part 15 is also provided with a stop protrusion 152, and the second side wall 24 is equipped with a lower concave surface 241. When the second tray main body 2 is detachably connected to the first mounting side wall 151, the stop protrusion 152 covers the lower concave surface 241. Through the above structure, when the user consumes the ice lolly, the second tray main body 2 can be inserted into the first mounting groove 1511 and the first sleeving opening 11 to seal the first sleeving opening 11, and then the ice lolly stick can be inserted into the second sleeving opening 21, so that the first accommodating groove 12 of the first tray main body 1 can accommodate the melted liquid of the ice lolly. The use of the first accommodating groove 12 to accommodate the melted liquid of the ice lolly increases the storage area compared with the second accommodating groove 22, thereby adapting to larger sized ice lollies to prevent the melted liquid of the ice lolly from flowing onto the hands and body of the consumer or the ground. Moreover, a side surface of the second top wall 23 is pressed against an inner wall of the first sleeving opening 11, a top surface of the second top wall 23 covers the first sleeving opening 11, the stop protrusion 152 covers the lower concave surface 241, and the outer side surface of the second side wall 24 is pressed against the inner side surface of the first mounting side wall, so that the first sleeving opening 11 and the first mounting groove can be sealed, preventing liquid from leaking out through the first sleeving opening 11. When the user consumes the ice-cream cone, the lifting portion 26 can be lifted to pull out the second top wall 23 and the second side wall 24 from the first sleeving opening 11 and the first mounting groove 1511 to open the first sleeving opening 11, and then the ice-cream cone can be inserted into the first sleeving opening 11, so that an outer wall of the ice-cream cone is pressed against the first sleeving opening 11, allowing the first accommodating groove 12 of the first tray main body 1 to accommodate the melted liquid of the ice-cream cone, and preventing the melted liquid of the ice-cream cone from flowing to the hands and body of the consumer or the ground.

In this embodiment, the leak-proof tray for frozen food further includes a flexible member 3, and the second tray main body 2 is connected to the first tray main body 1 through the flexible member 3. One end of the flexible member 3 is connected to the first mounting part 15, and an opposite end of the flexible member 3 is connected to the stop part 25. Through the above structure, the structure is simple, the design is reasonable, the connection is stable, and the first tray main body 1 and the second tray main body 2 are effectively connected into a whole.

In this embodiment, the first tray main body 1 is a first silicone tray main body or a first rubber tray main body, the second tray main body 2 is a second silicone tray main body or a second rubber tray main body, and the flexible member 3 is a silicone or rubber flexible member 3. Through the above structure, the first tray main body 1, the second tray main body 2 and the flexible component 3 that are made of silicone or rubber material have high safety and long service life, and are easy to clean, reuse, carry, and produce.

In this embodiment, the leak-proof tray for frozen food further includes an elastic wall 4. The elastic wall 4 is connected to the second tray main body 2, and the elastic wall 4 is movable to cover the second sleeving opening 21. The elastic wall 4 is integrally formed with the second tray main body 2. The elastic wall 4 is equipped with a first upper side wall 41, a first lower side wall 42, a first left side wall 43, and a first right side wall 44. The first lower side wall 42 is connected to the second tray main body 2. The first lower side wall 42, the first left side wall 43, and the first right side wall 44 are movable to detach from the second tray main body 2. Through the above structure, when the user does not insert the ice lolly stick into the second sleeving opening 21, the elastic wall 4 will restore to cover the second sleeving opening 21, making the appearance of the second tray main body 2 more flat and beautiful. When the user consumes the ice lolly, the ice lolly stick will squeeze the elastic wall 4 to detach from the second sleeving opening 21, so that the ice lolly stick can be inserted into the second sleeving opening 21, allowing the second accommodating groove 22 of the second tray main body 2 to accommodate the melted liquid of the ice lolly, and preventing the melted liquid of the ice lolly from flowing onto the hands and body of the consumer or the ground.

In this embodiment, a cross-section of the first mounting side wall 151 and a cross-section of the second side wall 24 are both in a truncated cone shape. The inner side surface of the first mounting side wall 151 is an inclined surface, and the outer side surface of the second side wall 24 is an inclined surface. An inner diameter of the first mounting side wall 151 gradually decreases from the bottom surface of the first mounting side wall 151 to a top surface of the first mounting side wall 151, and an outer diameter of the second side wall 24 gradually decreases from a top surface of the second side wall 24 to a bottom surface of the second side wall 24. Through the above structure, since the inner diameter of the first mounting side wall 151 gradually decreases from the bottom surface of the first mounting side wall 151 to the top surface of the first mounting side wall 151, and the outer diameter of the second side wall 24 gradually decreases from the top surface of the second side wall 24 to the bottom surface of the second side wall 24, during the process of pulling the second side wall 24 out of the first mounting groove 1511, the more the second side wall is pulled out in a direction away from the first mounting groove, the greater the squeezing force between the outer side surface of the second side wall 24 and the inner side surface of the first mounting side wall, which can effectively prevent the second side wall 24 from loosening in the first mounting groove 1511, and prevent the second tray main body 2 from loosening in the first sleeving opening and the first mounting groove, thereby effectively achieving the detachable connection between the second tray main body and the first mounting side wall.

In this embodiment, a length of the second sleeving opening 21 is less than a length of the first sleeving opening 11, and a width of the second sleeving opening 21 is less than a width of the first sleeving opening 11. A length range of the first sleeving opening 11 is 20 mm-50 mm, a width range of the first sleeving opening 11 is 20 mm-50 mm, a length range of the second sleeving opening 21 is 5 mm-25 mm, and a width range of the second sleeving opening 21 is 1 mm-10 mm. Specifically, a depth range of the first accommodating groove 12 is 5 mm-30 mm, and a depth range of the second accommodating groove 22 is 5 mm-30 mm. A depth range of the first sleeving opening 11 is 2 mm-30 mm, and a depth range of the second sleeving opening 21 is 1 mm-30 mm. Furthermore, a length range of the flexible member 3 is 5 mm-50 mm, and a width range of the flexible member 3 is 3 mm-30 mm. Furthermore, the first tray main body 1, the second tray main body 2, and the flexible member 3 are integrally formed. Furthermore, a length range of the first accommodating groove 12 is 40 mm-130 mm, and a width range of the first accommodating groove 12 is 40 mm-130 mm. A length range of the second accommodating groove 22 is 20 mm-50 mm, and a width range of the second accommodating groove 22 is 20 mm-50 mm. Furthermore, a thickness range of the flexible member 3 is 0.5 mm-30 mm. Furthermore, a top edge of the first tray main body 1 is provided with a plurality of concave notches 1311, and the first inner surface 13 is also provided with a plurality of rib positions 131 protruding toward the first accommodating groove 12. The first outer surface 14 is also provided with a plurality of groove positions 141 recessed toward the first accommodating groove 12. The groove positions 141 are aligned with the rib positions 131. Through the above structure, the size design of the first sleeving opening 11, the second sleeving opening 21, the first accommodating groove 12, and the second accommodating groove 22 is reasonable, which can adapt to the size of most frozen foods such as ice-cream cones and ice lollies, thereby achieving the leak-proof function for frozen foods. Moreover, since the first tray main body 1, the second tray main body 2, and the flexible member 3 are integrally formed, it is not only convenient for production, but also makes the overall strength of the leak-proof tray for frozen food greater. The second sleeving opening 21 of the second tray main body 2 is elongated, and the length of the second sleeving opening 21 is at least three times the width of the second sleeving opening 21. The elongated second sleeving opening 21 can be highly adapted to the shape of the ice lolly stick, making it easy to stably insert the ice lolly stick into the second sleeving opening 21.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A leak-proof tray for frozen food, comprising:
a first tray main body, wherein the first tray main body comprises a first sleeving opening, and the first sleeving opening is configured for receiving an ice-cream cone; a first accommodating groove is defined in the first tray main body, and the first sleeving opening is defined in a bottom wall of the first accommodating groove; and
a second tray main body, wherein the second tray main body is connected to the first tray main body, the second tray main body is equipped with a second top wall and a second side wall, the second top wall is provided with a second sleeving opening, and the second sleeving opening is configured for receiving an ice lolly stick;
wherein the second tray main body is detachably inserted into the first sleeving opening, and the second tray main body covers the first sleeving opening,
wherein the first tray main body is equipped with a first inner surface and a first outer surface, the first inner surface is recessed to form the first accommodating groove, the first tray main body is equipped with a first mounting part, the first mounting part is provided with a first mounting side wall, the first mounting side wall is positioned below the first sleeving opening, the second tray main body is detachably connected to the first mounting side wall, the second top wall covers the first sleeving opening, and the second side wall covers the first mounting side wall.

2. The leak-proof tray for frozen food according to claim 1, wherein the second top wall is connected to the second side wall, a first mounting groove is surrounded and formed by the first mounting side wall, a groove opening is defined in the first outer surface, the first sleeving opening is defined in the first inner surface, the first mounting groove is positioned below the first sleeving opening, one side of the first mounting groove is in communication with the first sleeving opening, and an opposite side of the first mounting groove is in communication with the groove opening; the second top wall is detachably inserted into the first sleeving opening through the groove opening, and the second side wall is detachably inserted into the first mounting groove through the groove opening, so that an outer side surface of the second side wall is pressed against an inner side surface of the first mounting side wall.

3. The leak-proof tray for frozen food according to claim 1, wherein the second tray main body is also provided with a stop part, the second top wall is connected to one side of the second side wall, and the stop part is connected to an opposite side of the second side wall.

4. The leak-proof tray for frozen food according to claim 3, wherein an outer diameter of the stop part is greater than an outer diameter of the second side wall, and the stop part stops at a bottom surface of the first mounting side wall.

5. The leak-proof tray for frozen food according to claim 3, wherein the second tray main body is also provided with a raised lifting portion, and the lifting portion extends from the stop part.

6. The leak-proof tray for frozen food according to claim 3, further comprising a flexible member, wherein the second tray main body is connected to the first tray main body through the flexible member, one end of the flexible member is connected to the first mounting part, and an opposite end of the flexible member is connected to the stop part.

7. The leak-proof tray for frozen food according to claim 1, further comprising a flexible member, wherein the second tray main body is connected to the first tray main body through the flexible member.

8. The leak-proof tray for frozen food according to claim 7, wherein the first tray main body is a first silicone tray main body or a first rubber tray main body, the second tray main body is a second silicone tray main body or a second rubber tray main body, and the flexible member is a silicone or rubber flexible member.

9. The leak-proof tray for frozen food according to claim 7, wherein a length range of the flexible member is 5 mm-50 mm, and a width range of the flexible member is 3 mm-30 mm.

10. The leak-proof tray for frozen food according to claim 7, wherein the first tray main body, the second tray main body, and the flexible member are integrally formed.

11. The leak-proof tray for frozen food according to claim 1, wherein a cross-section of the first mounting side wall and a cross-section of the second side wall are both in a truncated cone shape, the inner side surface of the first mounting side wall is an inclined surface, and the outer side surface of the second side wall is an inclined surface; an inner diameter of the first mounting side wall gradually decreases from the bottom surface of the first mounting side wall to a top surface of the first mounting side wall, and an outer diameter of the second side wall gradually decreases from a top surface of the second side wall to a bottom surface of the second side wall.

12. The leak-proof tray for frozen food according to claim 1, wherein a length of the second sleeving opening is less than a length of the first sleeving opening, and a width of the second sleeving opening is less than a width of the first sleeving opening.

13. The leak-proof tray for frozen food according to claim 1, wherein the first mounting part is also provided with a stop protrusion, and the second side wall is equipped with a lower concave surface; when the second tray main body is detachably connected to the first mounting side wall, the stop protrusion covers the lower concave surface.

14. The leak-proof tray for frozen food according to claim 1, wherein a length range of the first sleeving opening is 20 mm-50 mm, a width range of the first sleeving opening is 20 mm-50 mm, a length range of the second sleeving opening is 5 mm-25 mm, and a width range of the second sleeving opening is 1 mm-10 mm.

15. The leak-proof tray for frozen food according to claim 1, wherein the second sleeving opening of the second tray main body is elongated, and the length of the second sleeving opening is at least three times the width of the second sleeving opening.

16. A leak-proof tray for frozen food, comprising:
a first tray main body, wherein the first tray main body comprises a first sleeving opening, and the first sleeving opening is configured for receiving an ice-cream cone; a first accommodating groove is defined in the first tray main body, and the first sleeving opening is defined in a bottom wall of the first accommodating groove;
a second tray main body, wherein the second tray main body is connected to the first tray main body, the second tray main body is equipped with a second top wall and a second side wall, the second top wall is provided with a second sleeving opening, and the second sleeving opening is configured for receiving an ice lolly stick; and an elastic wall, wherein the second tray main body is detachably inserted into the first sleeving opening, and the second tray main body covers the first sleeving opening, wherein the elastic wall is connected to the second tray main body, and the elastic wall is movable to cover the second sleeving opening; the elastic wall is integrally formed with the second tray main body.

17. The leak-proof tray for frozen food according to claim 16, wherein the elastic wall is equipped with a first upper side wall, a first lower side wall, a first left side wall, and a first right side wall; the first lower side wall is connected to the second tray main body; the first lower side wall, the first left side wall, and the first right side wall are movable to detach from the second tray main body.

18. A leak-proof tray for frozen food, comprising:

a first tray main body, wherein the first tray main body comprises a first sleeving opening, and the first sleeving opening is configured for receiving an ice-cream cone; a first accommodating groove is defined in the first tray main body, and the first sleeving opening is defined in a bottom wall of the first accommodating groove; and a second tray main body, wherein the second tray main body is connected to the first tray main body, the second tray main body is equipped with a second top wall and a second side wall, the second top wall is provided with a second sleeving opening, and the second sleeving opening is configured for receiving an ice lolly stick;

wherein the second tray main body is detachably inserted into the first sleeving opening, and the second tray main body covers the first sleeving opening, wherein a second accommodating groove is defined in the second tray main body, and the second sleeving opening is defined in a bottom wall of the second accommodating groove.

19. The leak-proof tray for frozen food according to claim 18, wherein a depth range of the first accommodating groove is 5 mm-30 mm, and a depth range of the second accommodating groove is 5 mm-30 mm; a depth range of the first sleeving opening is 2 mm-30 mm, and a depth range of the second sleeving opening is 1 mm-30 mm.

* * * * *